(12) United States Patent
Okazaki et al.

(10) Patent No.: US 12,170,172 B2
(45) Date of Patent: Dec. 17, 2024

(54) CAPACITOR

(71) Applicant: KYOCERA Corporation, Kyoto (JP)

(72) Inventors: Toshiki Okazaki, Kirishima (JP);
Nobuyoshi Fujikawa, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 170 days.

(21) Appl. No.: 17/760,850

(22) PCT Filed: Sep. 10, 2020

(86) PCT No.: PCT/JP2020/034244
§ 371 (c)(1),
(2) Date: Mar. 16, 2022

(87) PCT Pub. No.: WO2021/059993
PCT Pub. Date: Apr. 1, 2021

(65) Prior Publication Data
US 2022/0344099 A1     Oct. 27, 2022

(30) Foreign Application Priority Data

Sep. 26, 2019 (JP) .................. 2019-175773

(51) Int. Cl.
*H01G 4/30* (2006.01)
*H01G 4/12* (2006.01)

(52) U.S. Cl.
CPC ............. *H01G 4/30* (2013.01); *H01G 4/1227* (2013.01)

(58) Field of Classification Search
CPC ............................. H01G 4/30; H01G 4/1227
See application file for complete search history.

(56) References Cited

U.S. PATENT DOCUMENTS

| | | | |
|---|---|---|---|
| 9,305,708 B2 * | 4/2016 | Kai | H01G 4/30 |
| 2009/0225494 A1 | 9/2009 | Yamazaki | |
| 2012/0075768 A1 * | 3/2012 | Takeda | H01G 4/1227 |
| | | | 501/137 |
| 2013/0208402 A1 * | 8/2013 | Hirata | H01G 4/232 |
| | | | 156/89.12 |
| 2016/0268045 A1 * | 9/2016 | Kaneko | H01G 4/30 |
| 2018/0308637 A1 | 10/2018 | Nishigaki et al. | |
| 2020/0043657 A1 * | 2/2020 | Ariizumi | H01G 4/1218 |

FOREIGN PATENT DOCUMENTS

| | | |
|---|---|---|
| CN | 101517672 A | 8/2009 |
| JP | 2011-132056 A | 7/2011 |
| JP | 2019-087568 A | 6/2019 |
| WO | 2017/073621 A1 | 5/2017 |

* cited by examiner

*Primary Examiner* — David M Sinclair
(74) *Attorney, Agent, or Firm* — Volpe Koenig

(57) ABSTRACT

A capacitor includes a capacitor body including a plurality of dielectric layers and a plurality of internal electrode layers being stacked alternately. The plurality of dielectric layers mainly include crystal grains containing barium titanate as a main component. The plurality of dielectric layers contain magnesium, a rare earth element, and manganese. The plurality of dielectric layers include oxide grains containing at least one of the magnesium, the rare earth element, or the manganese as a single element.

16 Claims, 2 Drawing Sheets

CAPACITOR

FIELD

The present disclosure relates to a stacked capacitor.

BACKGROUND

A known technique is described in, for example, Patent Literature 1.

CITATION LIST

Patent Literature

Patent Literature 1: Japanese Unexamined Patent Application Publication No. 2011 132056

BRIEF SUMMARY

A capacitor according to one or more embodiments of the present disclosure includes a capacitor body including a plurality of dielectric layers and a plurality of internal electrode layers being stacked alternately. The plurality of dielectric layers mainly include crystal grains containing barium titanate as a main component. The plurality of dielectric layers also contain magnesium, a rare earth element, and manganese. The plurality of dielectric layers include oxide grains comprising at least one of the magnesium, the rare earth element, or the manganese as a single element.

BRIEF DESCRIPTION OF DRAWINGS

The objects, features, and advantages of the present disclosure will become more apparent from the following detailed description and the drawings.

DETAILED DESCRIPTION

To be smaller and have higher capacity, stacked capacitors (hereafter, capacitors) with the structure that forms the basis of the capacitor according to one or more embodiments of the present disclosure nowadays include increasingly thinner dielectric layers and internal electrode layers.

A capacitor typically includes thinner dielectric layers to increase capacitance. However, a capacitor with such thinner dielectric layers can have unstable insulation. A capacitor with a voltage applied for a long time can generate heat and reach high temperature, and then have lower reliability. More specifically, a capacitor in an electronic device that is driven can gradually be heated to higher temperatures under a voltage applied continuously. The capacitor in this state is comparable to the capacitor in a reliability test constantly being tested for its high-temperature operating life.

A capacitor according to one or more embodiments will now be described with reference to FIGS. 1 to 3. The present disclosure is not limited to the specific embodiments described below. The present disclosure may be embodied in various forms without departing from the spirit or the scope disclosed herein defined by the appended claims.

Figure 1:
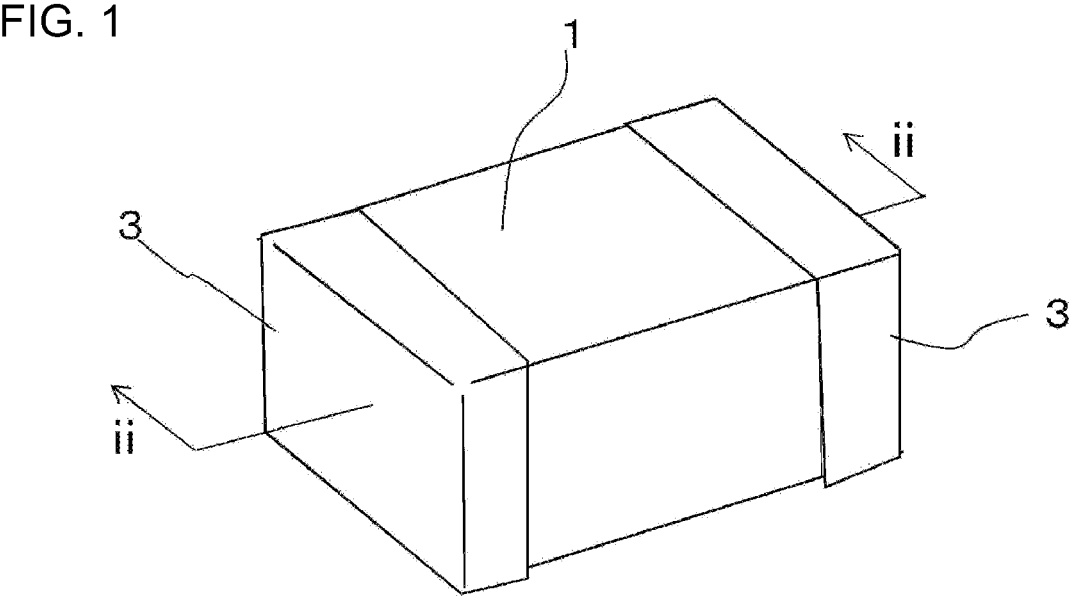
FIG. 1 is an external perspective view of a capacitor according to an embodiment.
Figure 2:
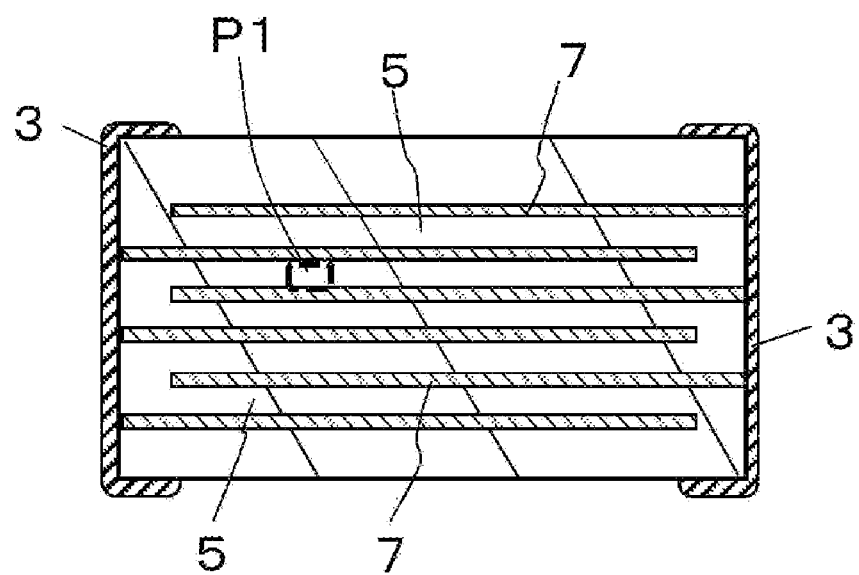
FIG. 2 is a cross-sectional view taken along line ii-ii in FIG. 1.

As shown in FIG. 1, the capacitor according to an embodiment includes a capacitor body 1 and external electrodes 3 located on its end faces. As shown in FIG. 2, the capacitor body 1 includes dielectric layers 5 and internal electrode layers 7 that are stacked alternately. Although FIG. 2 shows a stack of several dielectric layers 5 and several internal electrode layers 7 to simplify the drawing, the capacitor body 1 actually includes a stack of several hundred dielectric layers 5 and several hundred internal electrode layers 7. The external electrodes 3 are electrically coupled to the internal electrode layers 7.

The dielectric layers 5 mainly include crystal grains 9. The crystal grains 9 contain barium titanate as a main component. In other words, the dielectric layers 5 include, as a base phase 5A, the crystal grains 9 containing barium titanate as a main component. A main component herein refers to a component with the highest content in the crystal grains 9. The crystal grains 9 containing barium titanate as a main component thus refer to the crystal grains 9 having higher contents of titanium and barium than other components. The dielectric layers 5 mainly including the crystal grains 9 refer to the dielectric layers 5 each including a main portion with the highest volume percentage and with the major function. For example, a capacitor includes, as such a main portion, a sintered compact including crystal grains that contribute to the highest capacitance of the capacitor. The base phase 5A is similar in concept to such a main portion described above, and corresponds to a crystal phase having the highest volume percentage in the dielectric layers 5. For example, the base phase 5A is a crystal phase having a volume percentage of 60% or greater in the dielectric layers 5.

In the capacitor according to the embodiment, the dielectric layers 5 contain magnesium, a rare earth element, and manganese in addition to barium titanate. The dielectric layers 5 include oxide grains 11 containing at least one of the magnesium (Mg), the rare earth element (RE), or the manganese (Mn) as a single element. For example, the dielectric layers 5 including oxide grains 11 containing magnesium (Mg) refer to the dielectric layers 5 including crystal grains containing magnesium oxide (MgO) as a main component without forming a complex oxide with any other metal oxide. The dielectric layers 5 including the oxide grains 11 containing a specific element as a single element refer to the dielectric layers 5 including oxide grains 11 containing a metal oxide of the specific element with a diffraction peak detectable under X-ray powder diffraction. The metal oxide contains a single metal element alone.

Such an element in the dielectric layers 5 shows the highest count through element analysis conducted on the oxide grains 11 in the cross section of the dielectric layers 5, with the count being more than 10 times the count for other elements. The oxide grains 11 containing magnesium (Mg), a rare earth element (RE), or manganese (Mn) as a single element may be hereafter simply referred to as the oxide grains 11. The crystal grains 9 containing barium titanate as a main component may be hereafter simply referred to as main crystal grains 9. The main crystal grains 9 may have a grain size of 0.05 to 0.5 μm inclusive. Examples of the rare earth element (RE) include elements with atomic numbers 57 to 71, or the lanthanide series in the periodic table. Of these rare earth elements, dysprosium (Dy), yttrium (Y), erbium (Er), holmium (Ho), ytterbium (Yb), and terbium (Tb) may be used. The oxide grains 11 containing Dy, Y, Er, Ho, Yb, and Tb each as a single element are represented using the chemical formulas $Dy_2O_3$, $Y_2O_3$, $Er_2O_3$, $Ho_2O_3$, $Yb_2O_3$, and $Te_2O_3$. Examples of the manganese (Mn) include MnO and $Mn_2O_3$.

The oxide grains 11 containing magnesium, a rare earth element, and manganese each as a single element have higher thermal conductivity than the crystal grains 9 containing barium titanate as a complex oxide. Thus, the dielectric layers 5 including the barium titanate crystal grains 9 as the base phase 5A may include the oxide grains 11 containing at least one of magnesium, a rare earth element, or manganese as a single element to improve heat dissipation from the dielectric layers 5 including the main crystal grains 9 as the base phase 5A.

Under a direct-current (DC) voltage applied continuously, a capacitor generates heat over time. As the temperature of the capacitor rises, the holes such as oxygen vacancies can easily move in the dielectric layers 5. The dielectric layers 5 thus easily have lower insulation. The capacitor can have a shorter high-temperature operating life.

In contrast, the capacitor according to the embodiment includes the dielectric layers 5 containing the oxide grains 11 with higher thermal conductivity than barium titanate as described above. The dielectric layers 5 can thus have higher heat dissipation. Under a DC voltage applied continuously, this capacitor is less likely to be heated. The capacitor can thus have a longer high-temperature operating life.

In this case, the capacitor according to the embodiment may include the oxide grains 11 each having a diameter D corresponding to the mean grain size of the main crystal grains 9. The oxide grains 11 may have a diameter of, for example, 0.15 to 0.3 µm inclusive. The diameter of 0.15 to 0.3 µm inclusive of the oxide grains 11 refers to the mean grain size of the oxide grains 11 included in the dielectric layers 5. In this case, the capacitor may contain the oxide grains of which 90 percent or more have a diameter of 0.15 to 0.3 µm in terms of the number of grains. With the mean grain size of 0.15 to 0.3 µm inclusive, the oxide grains 11 each have a grain size approximate to the grain size of the main crystal grains 9. The oxide grains 11 and the main crystal grains 9 with similar grain sizes are likely to be in contact with each other at interfacial grain boundaries 13 as shown in FIG. 3. This increases the area of contact between the oxide grains 11 and the main crystal grains 9.

The mean grain size of the oxide grains 11 is determined as described below. The capacitor is first polished or cut to expose the cross section of the capacitor body 1. The exposed cross section of the capacitor body 1 is then polished. Subsequently, the polished cross section of the capacitor body 1 is observed with, for example, a scanning electron microscope including an analyzer, and an image of a specific area of the cross section is captured. In this process, the main crystal grains 9 and the oxide grains 11 are analyzed to identify their main components. An area of the captured image including oxide grains 11 and 200 to 300 main crystal grains is then specified. The outlines of the oxide grains 11 in the area including the 200 to 300 main crystal grains in the captured image are defined. The outlines of the oxide grains 11 then undergo image processing to determine the areas of the circles representing the outlines of the oxide grains 11. The diameter of each circle is then determined based on the area of each circle. Finally, the determined diameters of the circles are added together and then are averaged. This yields the mean grain size of the oxide grains. The diameter and the mean grain size of the main crystal grains 9 are also determined in the same manner.

Figure 3:
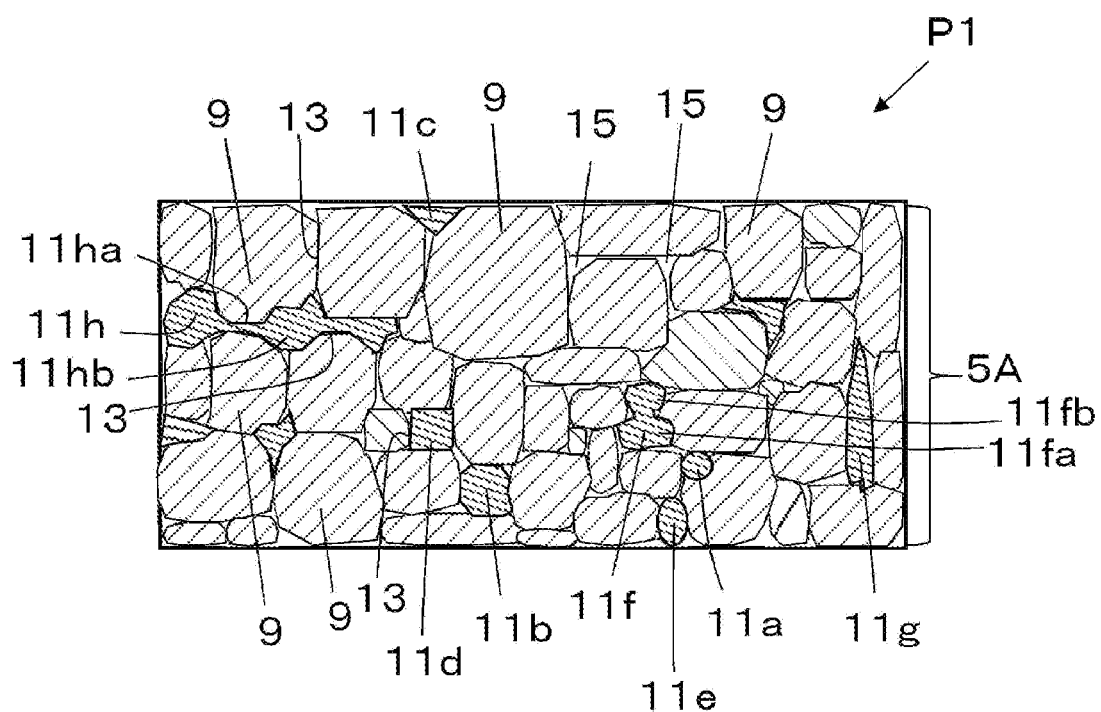
FIG. 3 is an enlarged cross-sectional view of a part P1 in FIG. 2.

As shown in FIG. 3, the cross section of each dielectric layer 5 in a plan view may include the main crystal grains 9 that are each, for example, circular or in the shape of a polygon similar to a circle. The shapes of the oxide grains 11 may correspond to the shapes of grain boundary phases 15 defined by multiple main crystal grains 9 adjacent to one another. The shapes of the oxide grains 11 in conformance with the shapes of the grain boundary phases 15 are defined as viewed in the cross section of the dielectric layers 5. The main crystal grains 9 being circular each have a generally round outline with the ratio D1/D2 of 1 to 1.1 inclusive, where D1 is a largest diameter in its radially longest portion and D2 is a smallest diameter in the direction perpendicular to the largest diameter D1. The main crystal grains 9 being polygonal each have at least two straight sides in its partial outline.

The shapes of the oxide grains 11 in conformance with the shapes of the grain boundary phases 15 each have, for example, an area defined between two or more main crystal grains 9 adjacent to one another. In other words, these oxide grains 11 are shaped to fill a space between two or more main crystal grains 9 adjacent to one another. The shapes of the oxide grains 11 in conformance with the shapes of the grain boundary phases 15 may include shapes that do not have specific names. Examples of the shapes of the oxide grains 11 will be provided below. The terms indicating the shapes of the oxide grains 11 are each denoted with a reference sign. As shown in FIG. 3, the shapes of the oxide grains 11 include a circle (11a), a polygon (11b), a triangle (11c), a rectangle (11d), an oval (11e), a two-sphere shape (11f), an arrowhead (11g), an irregular shape (11h) connecting a narrow portion (11ha) and an enlarged portion (11hb). The dielectric layers 5 may include the oxide grains 11 having multiple different shapes with reference signs 11a to 11h. The two-sphere shape 11f includes a larger grain portion 11fa and a smaller grain portion 11fb having a smaller volume than the larger grain portion 11fa joined together. The arrowhead 11g is basically triangular, or more specifically, has a pointy portion at one end and a round or flat portion at the other end. In this case, the arrowhead 11g includes, of the three sides, two sides curved outward slightly. The irregular shape 11h including the narrow portion 11ha and the enlarged portion 11hb is basically elongated. The narrow portion 11ha and the enlarged portion 11hb are joined together in the longitudinal direction. The enlarged portion 11hb may expand outwardly.

The oxide grains 11 with the shapes in conformance with the shapes of the grain boundary phases 15 defined by multiple main crystal grains 9 adjacent to one another may partially surround the main crystal grains 9. Also, the oxide grains 11 between the main crystal grains 9 can indirectly increase the area of contact between the adjacent main crystal grains 9. This structure improves the thermal conductivity of the capacitor.

In the capacitor according to the embodiment, the percentage of the oxide grains 11 included in the dielectric layers 5 may be 0.5 to 5% inclusive, and specifically 1.5 to 3% inclusive. The percentage of the oxide grains 11 is calculated from the diffraction intensity ratio of X-ray patterns obtained by grinding the dielectric layers 5 or the capacitor into powder as described below. In this case, the diffraction intensity I0 of a main peak (index 110) for barium titanate contained in the main crystal grains 9 and the diffraction intensity I1 of a main peak (index 111) for the oxide grains 11 are obtained to determine the diffraction intensity ratio I1/I0. With the diffraction intensity of 0.5% or greater, the oxide grains 11 can have effective heat conduction to the dielectric layers 5. With the diffraction intensity ratio of 3% or less, the dielectric layers 5 is less likely to have a lower dielectric constant to allow the capacitor to maintain high capacitance.

In the capacitor according to the embodiment, the capacitor body 1 may include the oxide grains 11 in its portion excluding the internal electrode layers 7. The oxide grains 11 in the portion of the capacitor body 1 excluding the internal electrode layers 7 can have high thermal conductivity at any positions in the capacitor body 1 and thus allow higher heat dissipation.

An example method for manufacturing the capacitor according to the embodiment will now be described. The capacitor according to the embodiment may be manufactured with a known method and by further adding raw material powders of magnesium, a rare earth element, and manganese as additives, which are previously calcinated to a predetermined degree, to ceramic green sheets for forming the dielectric layers 5 and firing the sheets for a short time at a higher rate of temperature rise than usual. A previously calcinated raw material powder used as an additive for a barium titanate raw material powder is more likely to remain in the form of a single metal oxide in the dielectric layers 5 after firing. In this case, the rate of temperature rise in firing may be increased within the range of the sinterability of the dielectric layers 5 being maintained. The capacitor body 1 is exposed to high temperature for a shorter period of time. The additive is thus more likely to remain as a single metal oxide after firing. As described above, the dielectric layers 5 can include the crystal grains 9 containing barium titanate as a main component and oxide grains 11 containing at least one of magnesium, a rare earth element, or manganese as a single element.

EXAMPLES

A capacitor was prepared and its characteristics were evaluated. A barium titanate powder and a glass powder as raw material powders for a dielectric powder were first prepared. For the barium titanate powder, a raw material powder with a mean particle size of 0.05 µm or less was used. For the glass powder, a powder with the composition of 55 mol % of $SiO_2$, 20 mol % of BaO, 15 mol % of CaO, and 10 mol % of $Li_2O$ was used. As the material powders for additives, a magnesium oxide powder and a manganese carbonate powder were prepared. An oxide powder of a rare earth element was also prepared. Table 1 shows the composition of the oxide powder of rare earth elements. The mean particle size of each of the magnesium oxide powder and the manganese carbonate powder was 0.1 µm. The mean particle size of the oxide powder of a rare earth element was 0.05 µm. Of these raw material powders, an oxide powder of a rare earth element calcinated with a maximum temperature of 850° C. and a hold time of two hours in the atmosphere was used for samples Nos. 1 to 20. For sample No. 21, a $Y_2O_3$ powder with a mean particle size of 0.1 µm was used. The $Y_2O_3$ powder used for sample No. 21 was a raw material powder without being calcinated.

The dielectric powder with 0.5 moles of a magnesium oxide powder in terms of MgO and 0.5 moles of a manganese carbonate powder in terms of MnO was added to 100 moles of the barium titanate powder. One part by mass of the glass powder was added to 100 parts by mass of the barium titanate powder. Table 1 shows the amounts of oxide powders of rare earth elements to be added.

An organic vehicle was mixed with the dielectric powder to obtain ceramic green sheets with an average thickness of 2.8 µm with the doctor blade method using the prepared slurry. A butyral resin was added to the organic vehicle for the ceramic green sheets. The amount of butyral resin to be added was 10 parts by mass to 100 parts by mass of the barium titanate powder. A solvent containing ethyl alcohol and toluene at a mass ratio of 1:1 was used. A conductive paste containing a nickel powder was used for forming internal electrode patterns.

The conductive paste was printed on the ceramic green sheets to obtain patterned sheets. Subsequently, 400 patterned sheets were stacked on one another into a core laminate. The ceramic green sheets were stacked on the upper surface and the bottom surface of the core laminate to obtain a base laminate. The base laminate was then cut into a capacitor body compact.

The capacitor body compact was fired to obtain a capacitor body. The capacitor body compact was fired with a maximum temperature of 1,100° C., a hold time of 10 minutes, and a temperature rise rate of 2,000° C./h with Roller Hearth Kiln (RHK). The resultant capacitor body was then reoxidized with a maximum temperature of 950° C. and a hold time of five hours in a nitrogen atmosphere. The resultant capacitor body has the dimensions of 2×1.2×1.2 mm. The dielectric layers have an average thickness of 2 µm. The inner electrode layers have an average thickness of 0.8 µm. The obtained capacitor has a capacitance of 11 µF, which is a designed value.

After the capacitor body was barrel-polished, an external electrode paste containing a copper powder as a main component was applied to the two ends of the capacitor body. The capacitor body was then thermally treated at 800° C. in a nitrogen atmosphere to form external electrodes. The surfaces of the external electrodes were plated with nickel and tin to complete the capacitor.

Another sample with the same composition as sample No. 5 was prepared with a temperature rise rate of 10,000° C./h in firing. The resultant capacitor includes the dielectric layers with a smaller percentage of oxide grains containing a rare earth element but includes oxide grains containing magnesium (magnesium oxide) as a single element and oxide grains containing manganese oxide ($Mn_2O_3$) as a single element. The peak ratio $R_2O_3$ (111)/BT (110) of X-ray diffraction intensity for the oxide grains of the rare earth element in the samples was 0.3%.

A complex oxide of a rare earth element and titanium oxide (pyrochlore: $RE_2Ti_2O_7$) was synthesized. Capacitors were formed in the same manner as described above but using the complex oxide as an additive. The capacitors obtained using the complex oxide (pyrochlore: $RE_2Ti_2O_7$) of a rare earth element and titanium oxide correspond to samples No. 8 to 10, 12, 14, 16, 18, and 20 shown in Table 1.

The obtained capacitors were evaluated in the manner described below. The electrical characteristics of the obtained capacitors were first measured. The capacitance of each capacitor was measured using a capacitance measurement device 4284A (Agilent Technologies, Inc.). The capacitance was measured with an alternating-current (AC) voltage of 0.5 V and a frequency of 1 kHz. The capacitors were then tested to determine the high-temperature operating life with a temperature of 125° C., a DC voltage of 40 V, and a hold time of 200 hours. A capacitor having a short-circuit in 200 hours (with a resistance of $10^1 \Omega$ or less) was determined defective (faulty). The thermal impact of each capacitor was tested by immersing the capacitor in a heated solder bath. A difference in the temperature of the solder bath and room temperature (25° C.) was set to 280°

C. Each capacitor was immersed for one minute. After being immersed in the solder bath, a capacitor with cracks was counted as a defective sample.

The mean grain size of the main crystal grains and the shapes and the mean grain size of the oxide grains were determined with the method described below using a scanning electron microscope including an analyzer. In a cross section of the polished capacitor body, a middle portion in the width direction (a middle step in the stacked direction) was selected, and an area with a width of 5 μm and a thickness of 5 μm was specified. The component(s) of crystal grains found in the area was then identified. The crystal grains in the base phase contain barium titanate.

The base phase contains oxide grains containing a rare earth as a single element. The diameter D of the oxide grains was determined as described below. The cross section of the dielectric layers was exposed. The exposed cross section was then mirror polished. The polished cross section of the dielectric layers was observed with a scanning electron microscope, and an image of a specific area of the cross section was captured. In the captured image, an area including oxide grains and also including 200 to 300 main crystal grains is specified. The outlines of the oxide grains in the area were manually defined in the captured image. The outlines of the oxide grains then underwent image processing to determine the areas of the circles. The diameters of the circles were determined based on the areas of the circles representing the outlines of the oxide grains. The average diameter value was calculated using the determined diameters of the oxide grains. In Table 1, the average value was used as the mean grain size ($D_{RE}$) of the oxide grains. The mean grain size ($D_{BT}$) of the main crystal grains and the mean grain size of the pyrochlore crystal grains were determined in the same manner. The ratio $D_{RE}/D_{BT}$ in Table 1 corresponds to the ratio of the mean grain size of the oxide grains ($D_{RE}$) to the mean grain size of the crystal grains ($D_{BT}$) mainly containing barium titanate.

In the prepared samples, the capacitors according to one or more embodiments of the present disclosure include oxide grains with varying cross-sectional shapes including more than half of shapes: the circle (11a in FIG. 3), the polygon (11b), the triangle (11c), the rectangle (11d), the oval (11e), the two-sphere shape (11f), the arrowhead (11g), and the irregular shape (11h) including the narrow portion (11ha) and the enlarged portion (11hb) joined together. In particular, the oxide grains had the shapes including the polygon (11b), the triangle (11c), the rectangle (11d), the oval (11e), the two-sphere shape (11f), the arrowhead (11g), the irregular shape (11h) including the narrow portion (11ha) and the enlarged portion (11hb) joined together.

The contents of such oxide grains in the dielectric layers were determined with the method described below using an X-ray diffraction device. The external electrodes were first removed from each prepared capacitor to obtain the capacitor body. The capacitor without the external electrodes was then ground into powder. In this process, as much metal components as possible were removed from the powder. The obtained powder was then analyzed using X-ray diffraction. The diffraction intensity ratio was determined using the peak of the index (110) for barium titanate and using the peak of the index (111) for oxide grains of a rare earth element. Table 1 shows the diffraction intensity ratios in the diffraction intensity ratio $RE_2O_3$ (111)/BT (110) field. Table 1 also shows the diffraction intensity ratios for pyrochlore in the diffraction intensity ratio $RE_2Ti_2O_7$ (222)/BT (110) field.

TABLE 1

| Sample No. | Oxide group ($RE_2O_3$) | | | | Pyrochlore ($RE_2Ti_2O$—) | | | | Oxide grains containing single element Contained: o Not contained: x |
|---|---|---|---|---|---|---|---|---|---|
| | Rare earth element | Amount of addition mol | Diffraction intensity ratio $RE_2O_3$ (111)/BT (110) % | Mean grain size ($D_{RE}$) μm | Rare earth element | Amount of addition mol 100% | Diffraction intensity ratio $RE_2Ti_2O$— (222)/BT (110) % | Mean grain size μm | |
| 1 | $D_y$ | 0.7 | 0.5 | 0.15 | — | — | — | — | o |
| 2 | | 1.1 | 1.0 | 0.18 | — | — | — | — | o |
| 3 | | 1.7 | 1.5 | 0.30 | — | — | — | — | o |
| 4 | | 1.7 | 1.5 | 0.35 | — | — | — | — | o |
| 5 | | 2.2 | 2.0 | 0.20 | — | — | — | — | o |
| 6 | | 3.2 | 3.0 | 0.20 | — | — | — | — | o |
| 7 | | 5.3 | 5.0 | 0.20 | — | — | — | — | o |
| 8 | | — | — | — | | 1.1 | 1.0 | 0.25 | x |
| 9 | | — | — | — | | 2.2 | 2.0 | 0.30 | x |
| 10 | | — | — | — | | 3.2 | 3.0 | 0.25 | x |
| 11 | Y | 1.6 | 1.5 | 0.20 | Y | — | — | — | o |
| 12 | | — | — | — | | 1.6 | 1.5 | 0.25 | x |
| 13 | Ho | 1.6 | 1.5 | 0.15 | Ho | — | — | — | o |
| 14 | | — | — | — | | 1.6 | 1.5 | 0.28 | x |
| 15 | Er | 1.6 | 1.5 | 0.15 | Er | — | — | — | o |
| 16 | | — | — | — | | 1.6 | 1.5 | 0.25 | x |
| 17 | Yb | 1.7 | 1.5 | 0.15 | Yb | — | — | — | o |
| 18 | | — | — | — | | 1.7 | 1.5 | 0.20 | x |
| 19 | Tb | 1.6 | 1.5 | 0.15 | Tb | — | — | — | o |
| 20 | | — | — | — | | 1.6 | 1.5 | 0.28 | x |
| 21 | Y | 1.0 | — | — | Y | — | — | — | x |

| Sample No. | Mean grain size of main crystal grain ($D_{BT}$) μm | $D_{RE}/D_{BT}$ | Capacitance μF | Conditions in high-temperature operating life test 125° C., 40 V, 200 h n 100 | Thermal impact test ΔT = 280° C. n 100 |
|---|---|---|---|---|---|
| 1 | 0.30 | 0.50 | 10.8 | 1 | 1 |
| 2 | 0.30 | 0.60 | 10.6 | 1 | 0 |

TABLE 1-continued

|    |      |      |      |   |   |
|----|------|------|------|---|---|
| 3  | 0.52 | 0.58 | 10.3 | 0 | 0 |
| 4  | 0.19 | 1.80 |  9.6 | 0 | 0 |
| 5  | 0.33 | 0.60 | 10.2 | 0 | 0 |
| 6  | 0 33 | 0.61 | 10.1 | 0 | 0 |
| 7  | 0.33 | 0.61 |  9.5 | 0 | 0 |
| 8  | 0.25 | 0.00 | 10.7 | 3 | 1 |
| 9  | 0.21 | 1.40 | 10.4 | 4 | 2 |
| 10 | 0.26 | 0.98 | 10.1 | 3 | 1 |
| 11 | 0.34 | 0.59 | 10.7 | 0 | 0 |
| 12 | 0.25 | 1.01 | 10.5 | 3 | 0 |
| 13 | 0.29 | 0.52 | 10.6 | 0 | 0 |
| 14 | 0.22 | 1.30 | 10.4 | 3 | 1 |
| 15 | 0.29 | 0.51 | 10.6 | 0 | 0 |
| 16 | 0.25 | 1.00 | 10.5 | 3 | 1 |
| 17 | 0.30 | 0.50 | 10.3 | 0 | 0 |
| 18 | 0.32 | 0.62 | 10.2 | 4 | 2 |
| 19 | 0.30 | 0.50 | 10.5 | 0 | 0 |
| 20 | 0.22 | 1.25 | 10.3 | 3 | 0 |
| 21 |  —   | 0.03 | 10.7 | 5 | 2 |

As shown in Table 1, for the samples including the dielectric layers with oxide grains containing a specific element as a single element (Nos. 1 to 7, 11, 13, 15, 17, and 19), defective samples occurred at a ratio of one out of 100 samples in the high-temperature operating life test. In a thermal impact test, such defective samples occurred at a ratio of less than one out of 100 samples.

The samples with the oxide grains having the mean grain size of 0.15 to 0.3 μm inclusive calculated using the circles representing the outlines of the oxide grains (Nos. 1 to 3, 5, 6, 11, 13, 15, 17, and 19) each have a capacitance of 10.1 μF or higher.

For the samples with the percentage of the oxide grains contained in the dielectric layers corresponding to the intensity ratio of 1.5 to 3% inclusive calculated using the main peak for barium titanate through X-ray powder diffraction (sample Nos. 3 to 6, 11, 13, 15, 17, and 19), no defective samples occurred in the high-temperature operating life test.

A capacitor including dielectric layers including oxide grains containing magnesium (magnesium oxide) and manganese oxide ($Mn_2O_3$) each as a single element in addition to a rare earth element has a capacitance of 10.1 μF. Defective samples occurred at a ratio of two out of 100 samples in the high-temperature operating life test.

For the samples containing pyrochlore crystal grains (sample Nos. 8 to 10, 12, 14, 16, 18, and 20), defective samples occurred at a ratio of three or more out of 100 samples in the high-temperature operating life test.

A sample including oxide grains containing yttrium oxide as a rare earth element without calcination (No. 21) includes, in the dielectric layers, dispersed complex oxide grains containing a rare earth element (Y) and silicon (Si), but includes no oxide grains containing $Y_2O_3$ as a single element. Defective samples occurred at a ratio of five out of 100 samples in the high-temperature operating life test.

The present disclosure may be implemented in the following forms.

A capacitor according to one or more embodiments of the present disclosure includes a capacitor body including a plurality of dielectric layers and a plurality of internal electrode layers being stacked alternately. The plurality of dielectric layers mainly include crystal grains containing barium titanate as a main component. The plurality of dielectric layers contain magnesium, a rare earth element, and manganese. The plurality of dielectric layers include oxide grains comprising at least one of the magnesium, the rare earth element, or the manganese as a single element.

The present disclosure may be embodied in various forms without departing from the spirit or the main features of the present disclosure. The embodiments described above are thus merely illustrative in all respects. The scope of the present disclosure is defined not by the description given above but by the claims. Any modifications and alterations contained in the claims fall within the scope of the present disclosure.

REFERENCE SIGNS LIST 1 capacitor body
3 external electrode
5 dielectric layer
5A base phase
7 internal electrode layer
9 main crystal grain
11 oxide grain
13 interfacial grain boundary
15 grain boundary phase

The invention claimed is:

1. A capacitor, comprising:
a capacitor body including a plurality of dielectric layers, wherein the plurality of dielectric layers each comprise magnesium, a rare earth element, and manganese; and
a plurality of internal electrode layers being that are stacked alternately with the plurality of dielectric layers to form the capacitor body,
wherein each of the plurality of dielectric layers includes:
mainly including main crystal grains comprising barium titanate as a main component, and
the plurality of dielectric layers comprising magnesium, a rare earth element, and manganese,
the plurality of dielectric layers including oxide grains comprising the magnesium as a single element alone.

2. The capacitor according to claim 1, wherein the oxide grains have a mean grain size of 0.15 to 0.3 μm inclusive calculated using circles representing outlines of the oxide grains.

3. The capacitor according to claim 1, wherein the plurality of dielectric layers include the oxide grains in a percentage corresponding to an intensity ratio of 1.5 to 3% inclusive calculated using a main peak for barium titanate with X-ray powder diffraction.

4. The capacitor according to claim 1, wherein
the oxide grains are included in a portion of the capacitor body excluding the plurality of internal electrode layers.

5. The capacitor according to claim 1, wherein each of the plurality of internal electrode layers have an average thickness of 0.8 μm.

6. The capacitor according to claim 1, wherein each of the plurality of dielectric layers have a thickness is 2 μm.

7. The capacitor according to claim 1, wherein the main crystal grains each have a generally round outline with a ratio D1/D2 of 1 to 1.1 inclusive, where D1 is a largest diameter in its radially longest portion and D2 is a smallest diameter in a direction perpendicular to the largest diameter D1.

8. A capacitor, comprising:
a plurality of dielectric layers, wherein the plurality of dielectric layers each comprise magnesium, a rare earth element, and manganese; and
a plurality of internal electrode layers that are stacked alternately with the plurality of dielectric layers to form a capacitor body,
wherein each of the plurality of dielectric layers includes:
main crystal grains comprising barium titanate as a main component and the main crystal grains each have a generally round outline with a ratio D1/D2 of 1 to 1.1 inclusive, where D1 is a largest diameter in its radially longest portion and D2 is a smallest diameter in a direction perpendicular to the largest diameter D1, and
oxide grains comprising the rare earth element as a single element alone.

9. The capacitor according to claim 8, wherein
the oxide grains have a mean grain size of 0.15 to 0.3 μm inclusive calculated using circles representing outlines of the oxide grains.

10. The capacitor according to claim 8, wherein
the plurality of dielectric layers include the oxide grains in a percentage corresponding to an intensity ratio of 1.5 to 3% inclusive calculated using a main peak for barium titanate with X-ray powder diffraction.

11. The capacitor according to claim 8, wherein
the oxide grains are included in a portion of the capacitor body excluding the plurality of internal electrode layers.

12. A capacitor, comprising:
a plurality of dielectric layers, wherein the plurality of dielectric layers each comprise magnesium, a rare earth element, and manganese; and
a plurality of internal electrode layers that are stacked alternately with the plurality of dielectric layers to form a capacitor body,
wherein each of the plurality of dielectric layers includes:
main crystal grains comprising barium titanate as a main component, and
oxide grains comprising the manganese as a single element alone.

13. The capacitor according to claim 12, wherein
the oxide grains have a mean grain size of 0.15 to 0.3 μm inclusive calculated using circles representing outlines of the oxide grains.

14. The capacitor according to claim 12, wherein
the plurality of dielectric layers include the oxide grains in a percentage corresponding to an intensity ratio of 1.5 to 3% inclusive calculated using a main peak for barium titanate with X-ray powder diffraction.

15. The capacitor according to claim 12, wherein
the oxide grains are included in a portion of the capacitor body excluding the plurality of internal electrode layers.

16. The capacitor according to claim 12, wherein the main crystal grains each have a generally round outline with a ratio D1/D2 of 1 to 1.1 inclusive, where D1 is a largest diameter in its radially longest portion and D2 is a smallest diameter in a direction perpendicular to the largest diameter D1.

* * * * *